United States Patent [19]
Lankhaar et al.

[11] Patent Number: 5,643,072
[45] Date of Patent: Jul. 1, 1997

[54] METHOD AND DEVICE FOR STUNNING OF POULTRY

[75] Inventors: Jenneke A. C. Lankhaar, Bokhoven; Adrianus J. van den Nieuwelaar, Gemert, both of Netherlands

[73] Assignee: Stork PMT B.V., Netherlands

[21] Appl. No.: 448,389

[22] PCT Filed: Dec. 30, 1993

[86] PCT No.: PCT/NL93/00284

§ 371 Date: Jun. 6, 1995

§ 102(e) Date: Jun. 6, 1995

[87] PCT Pub. No.: WO94/15469

PCT Pub. Date: Jul. 21, 1994

[30] Foreign Application Priority Data

Dec. 30, 1992 [NL] Netherlands ............. 9202289
Feb. 9, 1993 [NL] Netherlands ............. 9300254

[51] Int. Cl.⁶ .................................................. A22B 3/00
[52] U.S. Cl. .................................................. 452/66
[58] Field of Search ........................... 452/66, 57, 58, 452/141

[56] References Cited

U.S. PATENT DOCUMENTS

| | | | |
|---|---|---|---|
| 3,230,577 | 1/1966 | Hughes | 452/66 |
| 3,548,447 | 12/1970 | Price, Jr. | 452/66 |
| 4,092,761 | 6/1978 | McWhirter | 452/58 |
| 4,107,818 | 8/1978 | Scott et al. | 452/66 |
| 5,152,714 | 10/1992 | Ausley et al. | 452/66 |
| 5,186,677 | 2/1993 | Christensen et al. | 452/66 |
| 5,435,776 | 7/1995 | Owens et al. | 452/66 |

FOREIGN PATENT DOCUMENTS

| | | | |
|---|---|---|---|
| 0 434 278 | 6/1991 | European Pat. Off. | A22B 3/00 |
| 0 434 269 | 6/1991 | European Pat. Off. | A22B 3/08 |
| 2334296 | 8/1977 | France | A01M 13/00 |
| 2 466 198 | 4/1981 | France | A22B 3/00 |
| 2 534 469 | 4/1984 | France | A61D 7/04 |
| 61-42539 | 9/1986 | Japan . | |
| 62-282535 | 12/1987 | Japan . | |
| WO88/07328 | 10/1988 | WIPO | A22B 3/00 |

OTHER PUBLICATIONS

Japanese Abstract No. JP 02–31638, Takagi, Kinya; Device for Putting Edible Fowl Under Anesthesia; 90.02.01.

Gregory, "Stunning and Slaughter," *Processing of Poultry*, (Edited by G. C. Mead; Elsevier Applied Science, London and New York, pp. 31–63, 1989).

Kotula, et al., "Experimentation with In–Line Carbon Dioxide Immobilization of Chicken Prior to Slaughter," *Poultry Science* 40(1):213–216 (1991).

Scott, "The Slaughter of Poultry for Human Consumption," *Animal Regulation Studies*, 1:227–234 (1978).

"Carbon Dioxide Immobilization of Turkeys Before Slaughter," *United States Department of Agriculture Circular*, pp. 1–9 (Feb. 1955).

"1986 Report of the AVMA Panel on Euthanasia," *JAVMA*, 188(3):252–268 (Feb. 1, 1986).

*Primary Examiner*—Willis Little
*Attorney, Agent, or Firm*—Kilpatrick & Cody, L.L.P.; John S. Pratt

[57] ABSTRACT

Method and device for stunning poultry (8a, 8b, 8c, 8d), which poultry are taken into a first chamber (23) by means of a conveyer (2, 6), which chamber contains a first straining gas or gas mixture which is mixed with oxygen, and are subsequently taken into a a second chamber (33) which is essentially separated from the first chamber as regards gas and which contains a second stunning gas or gas mixture for increasing the stunning achieved in the first chamber.

24 Claims, 2 Drawing Sheets

METHOD AND DEVICE FOR STUNNING OF POULTRY

This application claims priority to International Application No. PCT/NL93/00284 filed on Dec. 30, 1993 and published as International Publication No. WO 94/15469, which claims priority to Netherlands Application No. 9202289 filed on Dec. 30, 1992, and Netherlands Application No. 9300254 filed on Feb. 9, 1993.

BACKGROUND OF THE INVENTION

The invention relates to a method and device for stunning poultry by means of a gas or gas mixture which, at the concentration in which it is present, has the effect of stunning the poultry.

From FR-A-2 334 296 a method and device are known for putting down small mammals, such as cats, puppies, mice, rats and the like. The method comprises placing the mammal to be killed in a first chamber which is open at the top and filled with a gas mixture of oxygen and carbon dioxide for a time which is sufficient to stun the animal. Subsequently, the animal is placed in a second chamber which is open at the top and filled with a high concentration of carbon dioxide for a time which is sufficient to end the life of the animal.

If poultry are to be stunned by means of a gas, one is not inclined to apply methods known for mammals, because of the fact that the respiratory system of poultry is structured differently from that of mammals and is connected to a number of air sacs which are located in the body of poultry and serve to provide buoyancy and body balance control. Said air sacs, which may either be filled with a considerable amount of air or may be empty, are the reason why stunning poultry by means of gas according to the state of the art sometimes takes a relatively long time and in some cases is effected relatively quickly. The resulting unreliability in stunning poultry by means of gas can, of course, be eliminated by continuing the stunning for such a long time that even poultry with a great deal of air in the air sacs can be guaranteed to have been stunned. However, the concomitant shortness of breath and fear reactions are accompanied by severe convulsions. Not only is this a very unpleasant situation for the poultry, but in general this also leads to contusions, fractures or the like, while the quality of the meat of the poultry is adversely affected by the concomitant biochemical immune responses in their body. Incidentally, electrocution, which is traditionally used for stunning poultry, has the same disadvantages.

Moreover, if such a method were to be used on an industrial scale for stunning poultry prior to their slaughter, a vast installation would be required to achieve the long residence time necessary for the poultry in a gas-filled chamber in view of the large numbers of poultry to be processed.

Surprisingly, it was found, however, that the method described above and known for mammals results in quick and reliable stunning when applied to poultry, without discomfort for the poultry, and thus without convulsions.

SUMMARY OF THE INVENTION

The object of the invention is thus to provide a method with a high processing rate for stunning poultry, in which method according to the invention the poultry are taken into a chamber by means of mechanical conveying means, which chamber contains a first stunning gas or gas mixture which is mixed with oxygen, and are subsequently taken into a chamber which contains a second stunning gas or gas mixture. It may be just one chamber which contains the first and the second stunning gas or gas mixture and the oxygen in the indicated order, but preferably the first stunning gas or gas mixture which is mixed with oxygen is in a first chamber, and the second stunning gas or gas mixture is in a second chamber which is essentially separated from the first chamber as regards gas. Because in the chamber or first chamber a stunning gas or gas mixture in combination with oxygen is present, the poultry can be stunned quickly and virtually without noticing it, if desired in such a way that results in unconsciousness, in which case the tranquillizing action of the gas or gas mixture prevents the occurrence of undesirable uncontrolled muscle movements, for example caused by anxiety or an unpleasant smell. As soon as the desired stunning in the chamber or first chamber is achieved, the stunning of the poultry can be increased in such a manner (by introducing the second stunning gas or gas mixture into the chamber or by transferring the poultry to the second chamber) that the poultry do not regain full consciousness prior to the slaughtering process. The poultry will be killed if they reside in the second gas or gas mixture for a sufficiently long period of time and the oxygen concentration is sufficiently low. Therefore, time is an important factor in determining the condition of the poultry after the stunning treatment. The residence time of the poultry in the chambers may be predetermined, based on empirical values, but it is also possible to choose the residence time as a function of a measurement of the concentration of the gas mixture in the chambers, or of a measurement of the poultry present in the chamber, for example a measurement of their heart rate. In order further to increase the efficiency of the stunning process, more than two chambers may be provided, optionally containing other stunning gases or gas mixtures, in different concentrations. It has been found that the method according to the invention yields meat of a better quality than the conventional method using electrocution. Especially the colour of the meat and the liver are improved and there is no extravasation.

Good stunning results are obtained if the oxygen concentration in the chamber or first chamber is at least 15% by vol. Preferably, the stunning gas in this case comprises carbon dioxide in a concentration of at least 25% by vol., but nitrous oxide, ether, cyclopropane or halothane can also be used advantageously as the stunning gas.

Particularly good stunning results are obtained if the first chamber contains a gas mixture of approximately 60% by vol. of carbon dioxide and at least approximately 30% by vol. of oxygen. It appears that when using such a gas mixture, poultry already become unconscious within between half a minute and several minutes, depending on their body weight, while virtually no discomfort for the poultry can be detected within that period of time.

In order to achieve as low as possible a gas consumption in the combination consisting of the first and second chamber, a portion of the gas or gas mixture is removed from the second chamber and mixed with oxygen in order to prepare the gas mixture for the first chamber.

An undesirable, unpleasant stimulation of the mucous membranes of the poultry when breathing in the gas contained in the chamber or chambers is prevented by humidifying the gas or gas mixture to be fed into the chamber or chambers, for example by passing the gas through a trough of water, by spraying water droplets into the gas or gas mixture, or by injecting it with steam. Preferably, the water with which the gas or gas mixture is brought into contact has a temperature of at least 25° C.

When stunning poultry prior to slaughtering in a conventional manner by means of an electric current, the poultry are usually stunned one at a time for practical reasons. Although this method can, of course, be maintained with the method according to the invention, the latter offers the advantageous possibility of simultaneously taking a number of poultry in a box or container into the chamber or chambers, which can appreciably increase the processing rate of the stunning process.

The invention furthermore relates to a device for implementing the method described above, comprising a first chamber and a second chamber having one or more openings through which the poultry can be taken into the first or second chamber, respectively, and be removed therefrom, the first chamber being provided with means for feeding in a first stunning gas or gas mixture which is mixed with oxygen, and the second chamber being provided with means for feeding in a second stunning gas or gas mixture, mechanical conveying means being provided for taking the poultry into the first and second chamber.

Preferably, provision is made for sealing means, for generally sealing the openings of at least the second chamber in a passable manner, as the concentration of the stunning gas or gas mixture is generally higher in the second chamber and escape of this gas is to be prevented as far as possible. Preferably, however, provision is also made for sealing means for generally sealing the openings of the first chamber.

In order to achieve a compact construction of the device, the outlet opening of the first chamber coincides with the inlet opening of the second chamber.

An adequate closing off of an opening of the first or second chamber is obtained by means of a strip curtain or air curtain, which prevents gas from leaking out of the first and second chamber, on the one hand, and can easily be passed through by the poultry, on the other hand.

In a preferred embodiment, the mechanical conveying means comprise a conveyor whose track extends in the first and second chamber. As the stunning gas or gas mixture generally has a higher density than air and therefore tends to accumulate at the bottom of the second chamber, escapes of gas from the second chamber can be reduced if the track of the conveyor in the second chamber descends from the inlet opening and ascends to the outlet opening. In order to achieve a good adjustment of the stunning process according to the invention to a subsequent section of a slaughtering line, in which the poultry are usually moved along by a conveyor at a constant speed, the conveyor used in the stunning process can be driven continuously at a certain speed, the dimensions of the first chamber in the conveying direction being such that the desired stunning of the poultry occurs in the first chamber at the given speed. However, at conventional poultry-conveying speeds, the dimensions of the first chamber will generally have to be considerable, which can sometimes be inconvenient. In such cases, a different embodiment is provided, in which the conveyor is driven intermittently and the poultry are in the first and second chamber, respectively, for two successive stationary periods of the conveyor. In this embodiment, the dimensions of the first and second chamber can be very small, viewed in the conveying direction.

In a preferred embodiment, the conveying means are equipped for conveying a box or a container holding poultry.

The device according to the invention can be incorporated into an existing slaughtering line, while it is also possible, moreover, to replace a conventional stunning apparatus incorporated into an existing slaughtering line with a device according to the invention. In both cases, only first and second chambers and gas feeding means will need to be installed in and along the track of a conveyor which is already present.

DESCRIPTION OF THE DRAWINGS

The invention explained with reference to the drawing, in which.

DESCRIPTION OF THE PREFERRED EMBODIMENTS

Figure 1:
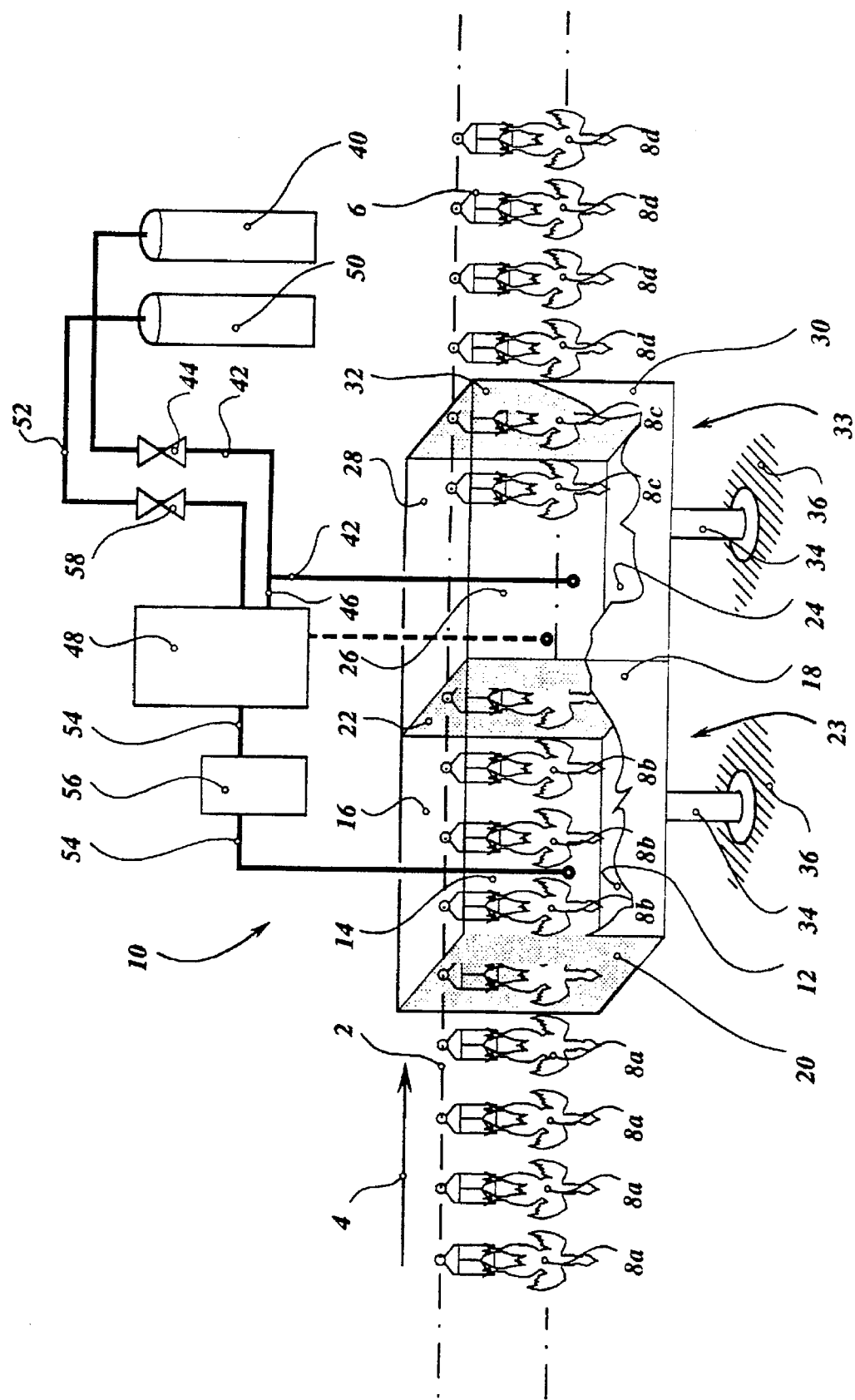
FIG. 1 shows a diagrammatic, partly cut-away view of a first embodiment of a stunning device for birds according to the invention.

In the figures, identical parts or parts having similar functions are referred to by identical reference numerals.

FIG. 1 shows a conveying rail, conveying chain 2 or the like, which is provided with hooks 6 from which birds 8a, 8b, 8c and 8d are suspended by their legs and which can be carried along in the direction of the arrow 4. In the path of the birds 8a, 8b, 8c and 8d a stunning device 10 is placed having a first chamber 23 bounded by walls 12, 14, 16, 18, 20 and 22, and a second chamber 33 bounded by walls 24, 26, 28, 30, 22 and 32. The first chamber 23 and the second chamber 33 are secured on a base 36 through supports 34. The configuration of the walls 20, 22 and 32 is such that a bird can pass through these walls, but that they are essentially sealed as regards gas when no bird is present. For this purpose, the walls 20, 22 and 32 are formed, for example, by a strip curtain, an air curtain, a water curtain or a moving screen. The remaining walls 12, 14, 16, 18 of the first chamber 23 and the walls 24, 26, 28, 30 of the second chamber 33 are essentially permanently closed and consist, for example, of steel-plate panels.

A supply tank 40 is filled with a pressurized stunning gas or gas mixture and is connected to the second chamber 33 via a pipe 42 which incorporates a shut-off valve 44. Furthermore, the supply tank 40 is connected to a mixing chamber 48 via a pipe 46. A supply tank 50 for pressurized oxygen is connected to the mixing chamber 48 via a pipe 52 which incorporates a shut-off valve 58. The mixing chamber 48 is connected to the first chamber 23 via a pipe 54 which incorporates a humidifier 56. For the purpose of recirculating gas, it is also possible to fit a pipe 60 which forms a connection between the second chamber 33 and the mixing chamber 48, instead of pipe 46 between supply tank 40 and mixing chamber 48. The pipe 60 is indicated by a dashed line in FIG. 1.

The device according to FIG. 1 operates as follows. By opening the shut-off valves 44 and 58, a mixture of the gases originating from supply tanks 40 and 50 is introduced into the first chamber 23. In this case, the shut-off valves 44 and 58 are adjusted in such a way that a predetermined concentration of the gases in the first chamber 23 is achieved. In addition, the shut-off valve 44 is set for feeding such an amount of gas originating from the supply tank 40 into the second chamber 33 that a predetermined concentration of the gas is achieved in the second chamber. Subsequently, the conveyor 2, 6 is activated, by means of which live birds 8a are taken into the first chamber 23. When they have arrived in the first chamber 23, the birds 8b are subjected to the stunning and tranquillizing action of the gas mixture originating from the supply tanks 40 and 50. Then the birds are taken into the second chamber 33 by passing through the wall 22. Upon arrival, the degree of stunning of the birds 8c achieved in the first chamber 23 is further increased by the stunning gas present in the second chamber 33, in which case the residence time in the second chamber 33 can be chosen to be long enough for the birds 8c to leave this chamber via the wall 32 stunned, unconscious or dead. The stunned, unconscious or dead birds 8d are then subjected to a conventional slaughtering process. Conveying the birds through the first chamber 23 and the second chamber 33 can be effected either at a constant or variable conveying speed or intermittently.

Figures 2A, 2B, 2C:
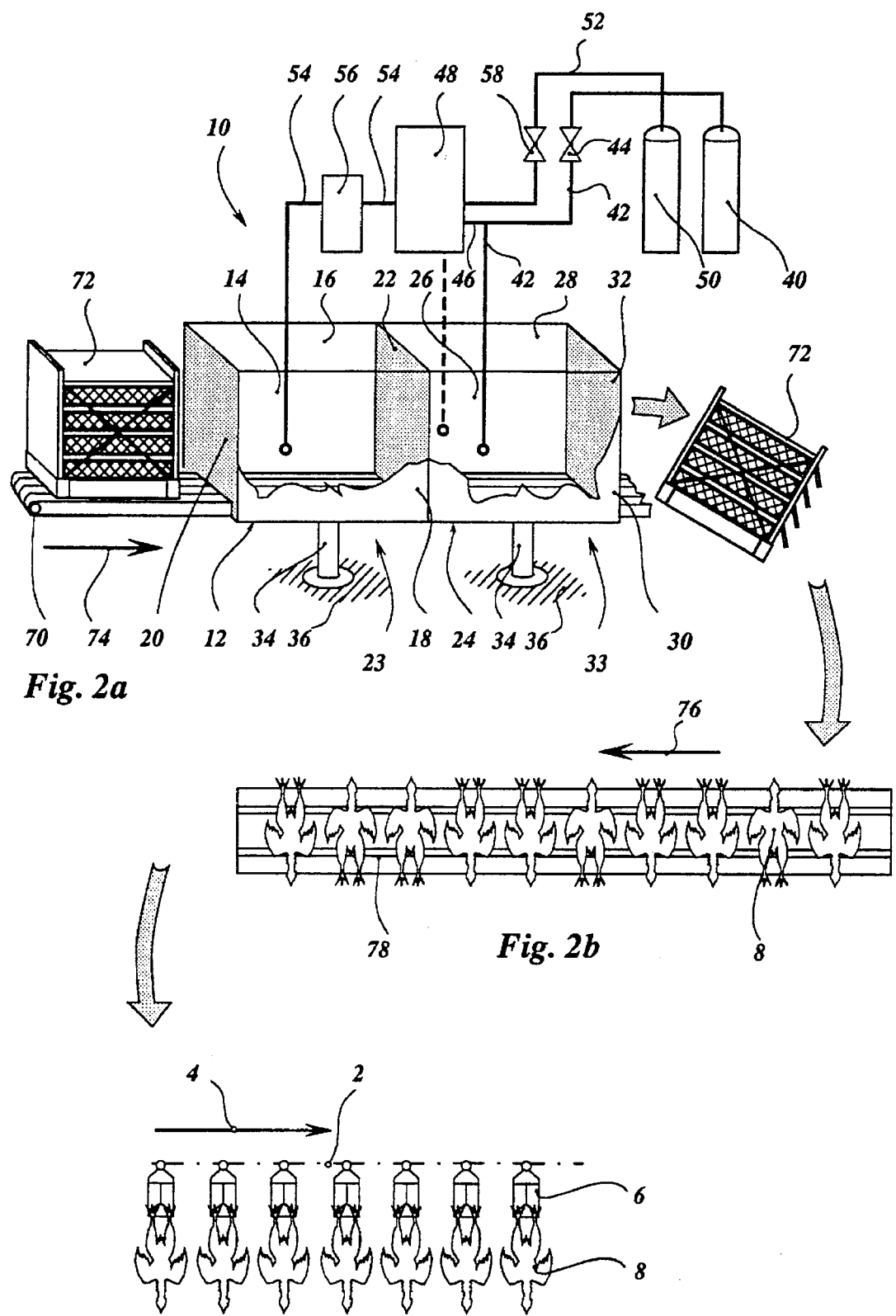
FIGS. 2a–2c show a diagrammatic, partly cut-away view of parts of a second embodiment of a stunning device for birds according to the invention.

FIG. 2a illustrates a stunning device 10 which generally corresponds to that according to FIG. 1. A conveyor belt 70 runs through the first chamber 23 and the second chamber 33 and can take a container 72 filled with live birds in the direction of the arrow 74 at a predetermined, optionally varying, speed successively through the wall 20 into the first chamber 23, through the wall 22 from the first chamber 23 to the second chamber 33, and away from the second chamber 33 through the wall 32. If the birds in the container 72 are in the first chamber 23, they can be subjected to the stunning and tranquillizing action of the gas mixture originating from the supply tanks 40 and 50; in the second chamber 33 they may also be subjected to the stunning action of the gas or gas mixture originating from supply tank 40.

FIG. 2b illustrates the bird processing stage which follows the stunning effected in accordance with FIG. 2a. The container 72 is emptied over a conveyor belt 78 moving in the direction of the arrow 76, as a result of which the stunned, unconscious or dead birds 8 will be carried along. People alongside the track of the conveyor belt 78 can take the birds 8 off the conveyor belt 78 and hang them on hooks 6 of a conveyor moving in the direction of the arrow 4, as is shown in FIG. 2c. Subsequently, the birds can be subjected to the conventional slaughtering processes, such as exsanguinating, plucking, eviscerating, portioning, boning and the like.

We claim:

1. A device for stunning poultry, comprising a first chamber and a second chamber and having one or more openings through which the poultry can be taken into the first and second chambers, respectively, and removed therefrom, the first chamber comprising sealing means for generally sealing the openings of the first chamber, and being provided with means for feeding in a first stunning gas or gas mixture which is mixed with oxygen in a concentration of at least 15% by volume fed in by oxygen supply means, and the second chamber being provided with means for feeding in a second stunning gas or gas mixture, and mechanical conveying means being provided for taking the poultry into and out of the first and second chambers.

2. The device for stunning poultry of claim 1, wherein the first stunning gas or gas mixture comprises carbon dioxide in a concentration of at least 25% by volume.

3. The device for stunning poultry of claim 1, wherein the first stunning gas or gas mixture comprises nitrous oxide, ether, cyclopropane or halothane.

4. The device for stunning poultry of claim 1, wherein the first chamber contains a gas mixture of approximately 60% by volume of carbon dioxide and at least approximately 30% by volume of oxygen.

5. The device for stunning poultry of claim 1, wherein the first stunning gas or gas mixture comprises a portion of the gas or gas mixture from the second chamber mixed with oxygen.

6. The device for stunning poultry of claim 1, wherein the gases or gas mixtures are humidified.

7. The device for stunning poultry of claim 6, wherein the gases or gas mixtures are brought into contact with water having a temperature of at least 25° C.

8. The device for stunning poultry of claim 1, further comprising a box or container within which a number of poultry may be simultaneously taken into the chambers.

9. The device for stunning poultry of claim 1, wherein the second stunning gas or gas mixture comprises carbon dioxide in a concentration of at least 25% by volume.

10. A device according to claim 1, further comprising sealing means for generally sealing the openings of at least the second chamber in a passable manner.

11. The device for stunning poultry of claim 1, wherein the second stunning gas or gas mixture comprises nitrous oxide, ether, cyclopropane or halothane.

12. A device according to claim 1, wherein the outlet opening of the first chamber coincides with the inlet opening of the second chamber.

13. A device according to claim 1, wherein one or more of the openings are sealed by a strip curtain.

14. A device according to claim 1, wherein the mechanical conveying means comprises a conveyor whose track extends in the first and second chamber.

15. A device according to claim 14, wherein the track of the conveyor in the second chamber ascends to the outlet opening.

16. A device according to claim 14, wherein the conveyor is driven continuously at a certain speed, the dimensions of the first chamber in the conveying direction being such that the desired stunning of the poultry occurs in the first chamber at the given speed.

17. A device according to claim 14, wherein the conveyor is driven intermittently and the poultry are in the first and second chamber, respectively, for two successive stationary periods of the conveyor.

18. A device according to claim 1, wherein the conveying means are adapted for conveying a box or a container holding poultry.

19. A device according to claim 1, wherein one or more of the openings are sealed by an air curtain.

20. A device according to claim 1, wherein the oxygen supply means comprises an oxygen supply tank.

21. A device for stunning poultry, comprising:
   (a) a first chamber
   (b) a second chamber,
      each of the chambers having at least one opening through which the poultry can be placed within or removed from the chamber and at least one first chamber opening coinciding with at least one second chamber opening,
   (c) a means for feeding into the first chamber a first stunning gas or gas mixture which contains oxygen in a concentration of at least 15% by volume, and
   (d) a means for feeding into the second chamber a second stunning gas or gas mixture.

22. A device for stunning poultry, comprising:
   (a) a first chamber
   (b) a second chamber,
      each of the chambers having at least one opening through which the poultry can be placed within or removed from the chamber,
   (c) a strip curtain sealing at least one of the openings,
   (d) a means for feeding into the first chamber a first stunning gas or gas mixture which contains oxygen in a concentration of at least 15% by volume, and (e) a means for feeding into the second chamber a second stunning gas or gas mixture.

23. A device for stunning poultry, comprising:
(a) a first chamber
(b) a second chamber,
   each of the chambers having at least one opening through which the poultry can be placed within or removed from the chamber,
(c) an air curtain sealing at least one of the openings,
(d) a means for feeding into the first chamber a first stunning gas or gas mixture which contains oxygen in a concentration of at least 15% by volume, and
(e) a means for feeding into the second chamber a second stunning gas or gas mixture.

24. A device for stunning poultry, comprising:
(a) a first chamber
(b) a second chamber,
   each of the chambers having at least one opening through which the poultry can be placed within or removed from the chamber,
(c) a means for feeding into the first chamber a first stunning gas or gas mixture which contains oxygen in a concentration of at least 15% by volume, and
(d) a means for feeding into the second chamber a second stunning gas or gas mixture,
   wherein the first stunning gas or gas mixture is prepared by removing a portion of the gas or gas mixture from the second chamber and mixing it with oxygen.

\* \* \* \* \*